United States Patent
Buckeridge

[15] 3,665,251
[45] May 23, 1972

[54] CONTINUOUS GROUND MONITORING CIRCUIT

[72] Inventor: Roger M. Buckeridge, Downers Grove, Ill.

[73] Assignee: Westinghouse Air Brake Company, Pittsburgh, Pa.

[22] Filed: May 14, 1971

[21] Appl. No.: 143,460

[52] U.S. Cl. ........................................................317/18 A
[51] Int. Cl. ...............................................................H02h 3/16
[58] Field of Search ......................317/18 A, 18 C; 324/51

[56] References Cited

UNITED STATES PATENTS

| | | | |
|---|---|---|---|
| 3,335,324 | 8/1967 | Buckeridge | 317/18 A |
| 3,402,326 | 9/1968 | Guasco et al. | 317/18 A |
| 3,496,416 | 2/1970 | Agnew et al. | 317/18 A |
| 3,562,588 | 2/1971 | Zielasko | 317/18 A |

*Primary Examiner*—James D. Trammell
*Attorney*—Fitch, Even, Tabin & Luedeka

[57] ABSTRACT

A fail-safe continuous ground monitoring circuit formed by ground and check wires extending between a remote switching area and a mobile machine or point of use. The monitoring circuit is arranged to hold main power contactors closed, at the remote switching area, only as long as there is a satisfactory ground for the machine and as long as the monitoring circuit is functioning properly. In the event a fault or short occurs in the ground or check wires, the monitoring circuit automatically causes the main power contactors to open, removing power from the machine, and at the same time deenergize a control relay to remove all power from the monitoring circuit.

3 Claims, 1 Drawing Figure

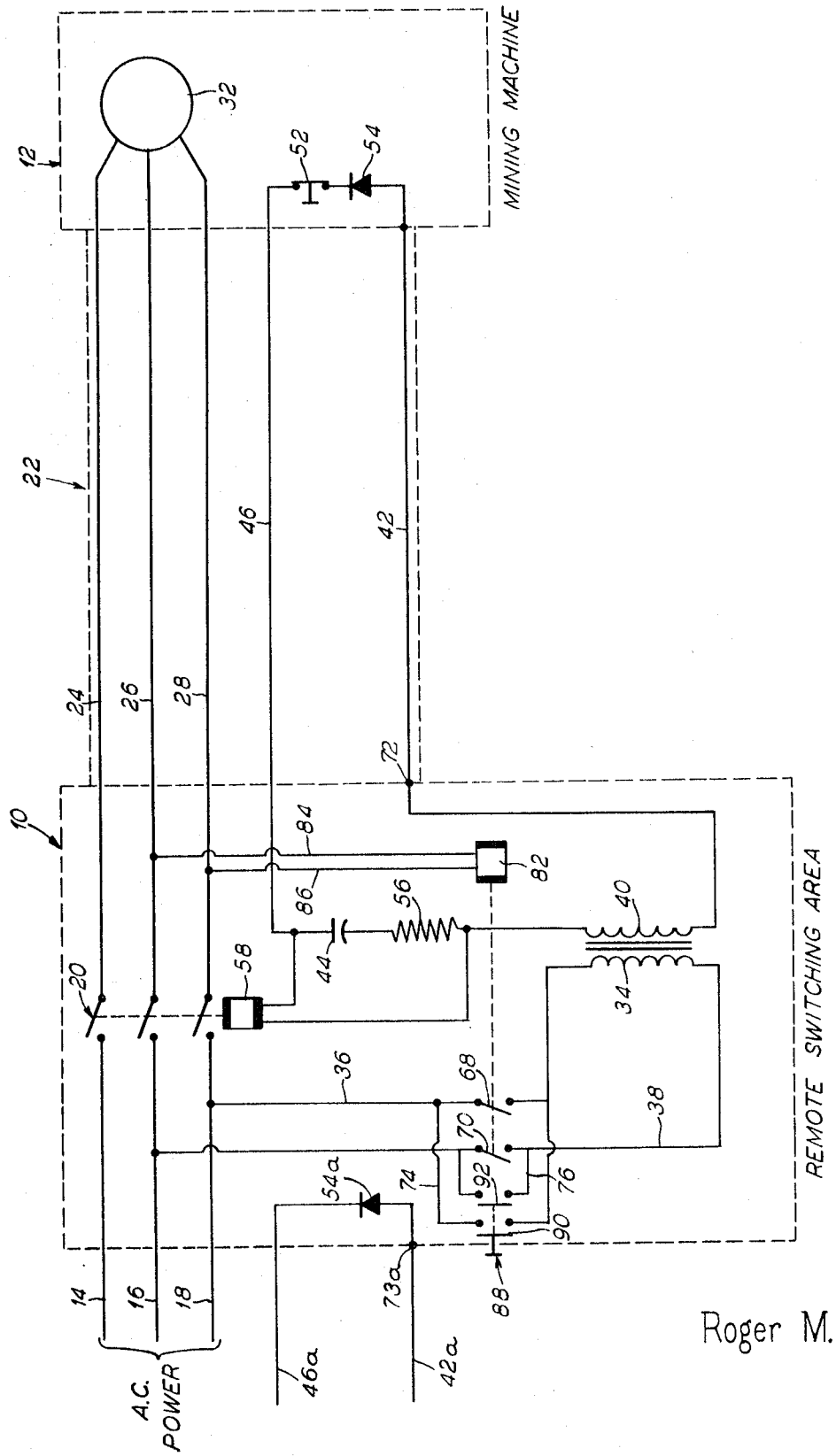

CONTINUOUS GROUND MONITORING CIRCUIT

BACKGROUND OF THE INVENTION

This invention is an improvement in the ground monitoring circuit of my U.S. Pat. No. 3,335,324, issued Aug. 8, 1967, and entitled "Fail-Safe Continuous Ground Monitoring Circuit". The above mentioned patent provides fail-safe machine grounding protection as required by the United States Bureau of Mines. This circuit is arranged to remove power from the main line circuit whenever there is a short or break in the ground or check wires. The potential used for the monitoring signal, however, is continuously applied to the ground circuit. This voltage is in the order of approximately 32 volts, which is not dangerous from the standpoint of a shock hazard to the machine operator, however, there is the possibility of a sparking hazard associated with a damaged trailing electrical cable. Even the slight possibility of open sparks in the dusty and often gaseous ambient of a coal mine must be effectively dealt with to prevent an explosion. The many lives lost in coal mine explosions in the past few years bears witness to the urgent necessity of eliminating even the slightest hazards of sparking.

SUMMARY OF THE INVENTION

This invention is directed to an improved fail-safe continuous ground monitoring circuit including a ground and ground check wire extending between a remote switching area or electrical sub-station and a point of use or mobile mining machine, working at a distance from its main power contactor at the sub-station. The monitoring circuit automatically deenergizes the electrical power system at the contactor, to cut off power to the machine, any time there is a short between the ground and check wires or when either wire is broken. The present invention further provides for the automatic discontinuance of power to the monitoring circuit when the main power contactors are opened. This is accomplished by means of a normally open contact in each of the power leads to the monitoring circuit being closed in response to energization of a control relay coil. The control relay coil is connected to the main power conductors on the machine side of the main power contactors. Accordingly, if the main power contactors open, control relay coil will deenergize and the normally open contacts in the monitoring power leads will open and cut off power to the circuit. All power is thus removed from the monitoring circuit.

Accordingly, a principle object of the present invention is to eliminate all electrical power in the main line power circuit and the monitoring circuit whenever a fault occurs in the monitoring circuit.

A further object of this invention is to eliminate sparking hazards involving a damage ground monitoring circuit. Another object of this invention is to automatically cut off power in the ground monitoring circuit when power is removed from the machine.

These and other objects of the invention will become apparent in the following specification, claims and drawing.

DESCRIPTION OF THE DRAWING

The invention is illustrated diagrammatically in the attached circuit diagram illustrating a preferred form of the invention.

DESCRIPTION OF PREFERRED EMBODIMENT OF THE INVENTION

As shown in the drawing, a remote switching area or substation designated generally at 10 is connected to a point of use or mobile machine designated generally at 12 by a five conductor trailing cable 22. The trailing cable 22 includes three main power conductors 24, 26, 28 and two auxiliary conductors 42 and 46. Auxiliary conductor 42 comprises a ground wire, and auxiliary conductor 46 comprises an insulated ground check wire. Wires 14, 16 and 18 bring A.C. electrical power to the sub-station 10 and a set of contacts 20 control the flow of the three-phase power out over the cable 22 to the point of use 12. A motor 32 on the mobile mining machine 12 is connected to the main power conductors 24, 26 and 28 and is powered thereby.

For safety of the mining machine operator, it is essential that the continuity of the ground wire 42 be maintained at all times. If a break occurs in the ground wire, or if the ground check wire is shorted to the ground wire, main power contacts 20 at the sub-station open instantly and automatically and remain open until the trouble is found and repaired.

A step down transformer 34 is shown connected to A.C. power wires 16 and 18 through lines 36 and 38, and control contacts 68 and 70. Control contacts 68 and 70, which are normally biased to an open position, are responsive to control relay coil 82 and will close when coil 82 is energized. Coil 82 is connected to main power conductors 26 and 28 within substation 10 by means of lines 84, 86 and is energized by the A.C. current powering the motor 32. The secondary of transformer 34, indicated at 40, is connected on one side to ground wire 42 which is also connected to the sub-station case as at 72. The sub-station case is at ground potential by effective grounding as will be described later. The other side of the secondary 40 is connected through a capacitor 44 to check wire 46, with both the check wire 46 and the ground wire 42 positioned within the trailing cable 22 and continuing to the mining machine 12.

At the mining machine there is shown an off switch 52 and a rectifier means 54 connected in series between wires 46 and 42. The rectifier means 54 consists of a half wave rectifier consistent with the energization requirements of contactor coil 58. The ground monitoring circuit is completed with a resistor 56 in series with capacitor 44 in parallel with relay coil 58. Relay coil 58 is actuatable by the D.C. current output of the rectifier 54 to hold contacts 20 closed so long as the D.C. current is present in the check wire 46. A break in either one of the lines 42, 46 or a short between them will cut the D.C. current to the relay coil 58, causing the relay to deenergize and open contacts 20. Relay 58 blocks passage of A.C. current so that the A.C. currents induced into the secondary 40 are ineffective to energize relay coil 58. The capacitor 44 will effectively smooth out the D.C. pulsating (half wave) current to supply a substantially continuous D.C. current to the relay coil 58. The resistor 56 is provided in the circuit to insure that coil 58 will not be subjected to damaging power surges.

By-pass lines 74 and 76 are connected in parallel relative to the contacts 68 and 70, to lines 36 and 38. Push button switch 88, when pressed, close contacts 90 and 92 to complete the by-pass circuit around open control contacts 68 and 70 to provide transformer 34 with main line voltage. The transformer secondary 40, reduces the main line voltage to a voltage level of approximately 32 Volts A.C.

When the ground monitoring circuit is in full operation, relay coil 58 will close contacts 20 and motor 32 will then be connected to the power lines 14, 16 and 18 through main line conductors 24, 26 and 28. At the same time lines 84 and 86 will energize coil 82 closing contacts 68 and 70 to connect lines 36 and 38 directly to the transformer 34. The circuit will then remain energized and push button 88 can be released.

The voltage at the secondary is sufficiently low as not to be dangerous relative to shock hazards, but yet is of a value which will be effective in an operating circuit between the substation and the mining machine. However, with an open or a short in the monitoring circuit, generally associated with a damaged trailing cable 22, bare wires may be exposed and a potential sparking danger may exist.

As described in detail in my above mentioned U.S. Pat. No. 3,335,324, the open or short will interrupt the D.C. current in the check wire 46 causing relay coil 58 to deenergize and open main line contacts 20. Power is thus removed from the main line conductors 24, 26 and 28 and therefore lines 84 and 86 no longer can energize control coil 82. Coil 82 will accordingly allow the biased control contacts 68 and 70 to open and cut off power to transformer 34, eliminating current in the secondary 40 and in the entire ground monitoring circuit. Pressing push button 88 will not start up the machine again as long as the open or short remains. Thus, whenever main line contacts 20 are open, all power is removed from the trailing cable 22 and the possibility of sparks originating with the monitoring circuit has been eliminated.

The sub-station 10 may be grounded in any suitable manner, however, in the preferred embodiment a second ground monitoring circuit, similar to the one just described, is used for that purpose. A portion of the ground circuit may be seen in the drawing including a ground wire 42a, grounded to the frame as at 73a and connected to a rectifier 54a. A check wire 46a is also connected to the rectifier 54a.

Ground monitoring circuit wires 46a, 42a and power lines 14, 16 and 18 may be connected between the portable sub-station 10 and a fixed power center (not shown). The fixed power center may be permanently grounded with a physical connection to an adequate metallic grounding system. Obviously, the fixed power center will include contacts, relay coils, transformer, etc. similar to the sub-station 10 and this monitoring circuit will perform in the same manner as the monitoring circuit extending between the mining machine and the sub-station.

The embodiment of my invention herein shown and described is intended as being illustrative and it should be realized that there are many modifications that may be made thereto without departing from the spirit and scope of the following claims.

I claim as my invention:

1. In a fail-safe ground monitoring circuit including ground and ground check conductors for use with an electrical system supplying power from a remote switching area to a point of use;

means arranged to cut off electrical power to the said point of use responsive to a fault in the ground conductor, and means arranged to cut off power to the monitoring circuit in response to cutting off power to the point of use.

2. In a fail-safe ground monitoring circuit including ground and check conductors extending between a remote switching area and a point of use;

contactor means in said circuit, at the remote switching area, actuatable to a holding condition in response to direct current in said circuit;

means at the remote switching area, for applying a varying voltage signal to said circuit, including a control contact;

means at the point of use, for generating a direct current in said circuit in response to said varying voltage signal for actuating said contactor means to its holding condition, whereby the control contact is actuable to a closed condition in response to a holding condition of the contactor means.

3. In a fail-safe ground monitoring circuit for use with an electrical system supplying A.C. power from a remote switching area to a point of use;

A ground monitoring circuit between said switching area and said point of use;

Means at the switching area, connected to said A.C. power and to said monitoring circuit for supplying power to said monitoring circuit;

Main control contacts in said A.C. power system at said switching area;

Means, in said monitoring circuit and at said switching area, operably responsive to D.C. power for actuating said main control contacts, Means, in said monitoring circuit, and at said point of use, for utilizing the power in said monitoring circuit to provide D.C. operating current for said actuating means, whereby a fault in said monitoring circuit interrupts said D.C. operating current, causing the main control contacts to open;

A control contact in said monitoring circuit and at said switching area;

Means, in said A.C. power system at said switching area operably responsive to A.C. power for actuating said monitoring circuit control contact, whereby open main control contacts interrupt said A.C. power, causing the monitoring circuit control contacts to open, removing power from said monitoring circuit.

* * * * *